(12) United States Patent
Tokioka

(10) Patent No.: US 7,695,372 B2
(45) Date of Patent: Apr. 13, 2010

(54) YOKE FOR UNIVERSAL JOINT AND UNIVERSAL JOINT

(75) Inventor: Ryouichi Tokioka, Nara (JP)

(73) Assignee: JTEKT Corporation, Osaka (JP)

( * ) Notice: Subject to any disclaimer, the term of this patent is extended or adjusted under 35 U.S.C. 154(b) by 312 days.

(21) Appl. No.: 11/808,525

(22) Filed: Jun. 11, 2007

(65) Prior Publication Data

US 2007/0293326 A1 Dec. 20, 2007

(30) Foreign Application Priority Data

Jun. 19, 2006 (JP) ............... 2006-169140

(51) Int. Cl.
F16D 3/40 (2006.01)
(52) U.S. Cl. .................................. 464/134
(58) Field of Classification Search ......... 464/134–136; 403/235
See application file for complete search history.

(56) References Cited

U.S. PATENT DOCUMENTS

| | | | | |
|---|---|---|---|---|
| 699,904 A | * | 5/1902 | Warren | 464/134 |
| 927,087 A | * | 7/1909 | Vanderbeek | 464/134 |
| 2,432,395 A | * | 12/1947 | Dunn | 464/136 X |
| 3,124,877 A | * | 3/1964 | Macchini | |
| 4,472,158 A | * | 9/1984 | Joyner | 464/134 |
| 5,916,026 A | | 6/1999 | Sadakata | |

FOREIGN PATENT DOCUMENTS

| | | | |
|---|---|---|---|
| EP | 1691092 | | 8/2006 |
| FR | 1 254 364 A | | 2/1961 |
| GB | 1 269 625 | * | 4/1972 ... 464/134 |
| GB | 1 345 664 | * | 1/1974 ... 464/136 |
| JP | 2000-97246 | | 4/2000 |
| JP | 2001-254755 | | 9/2001 |
| JP | 2005-163866 | | 6/2005 |

* cited by examiner

Primary Examiner—Greg Binda
(74) Attorney, Agent, or Firm—Rabin & Berdo, PC

(57) ABSTRACT

A yoke for universal joint includes a cylindrical base, and a pair of arms extending from an end of the base in parallel to a center axis of the base. Each of the arms is formed with a support hole for supporting a corresponding trunnion of a cross shaft via a bearing. The support hole of each arm has a center axis extending in a direction orthogonal to the center axis of the base. A relief portion including a concave curved surface is formed at the end of the base. The concave curved surface of the relief portion has a center of curvature located at place offset from a center of a joint 1 toward a distal end of the arm.

6 Claims, 9 Drawing Sheets

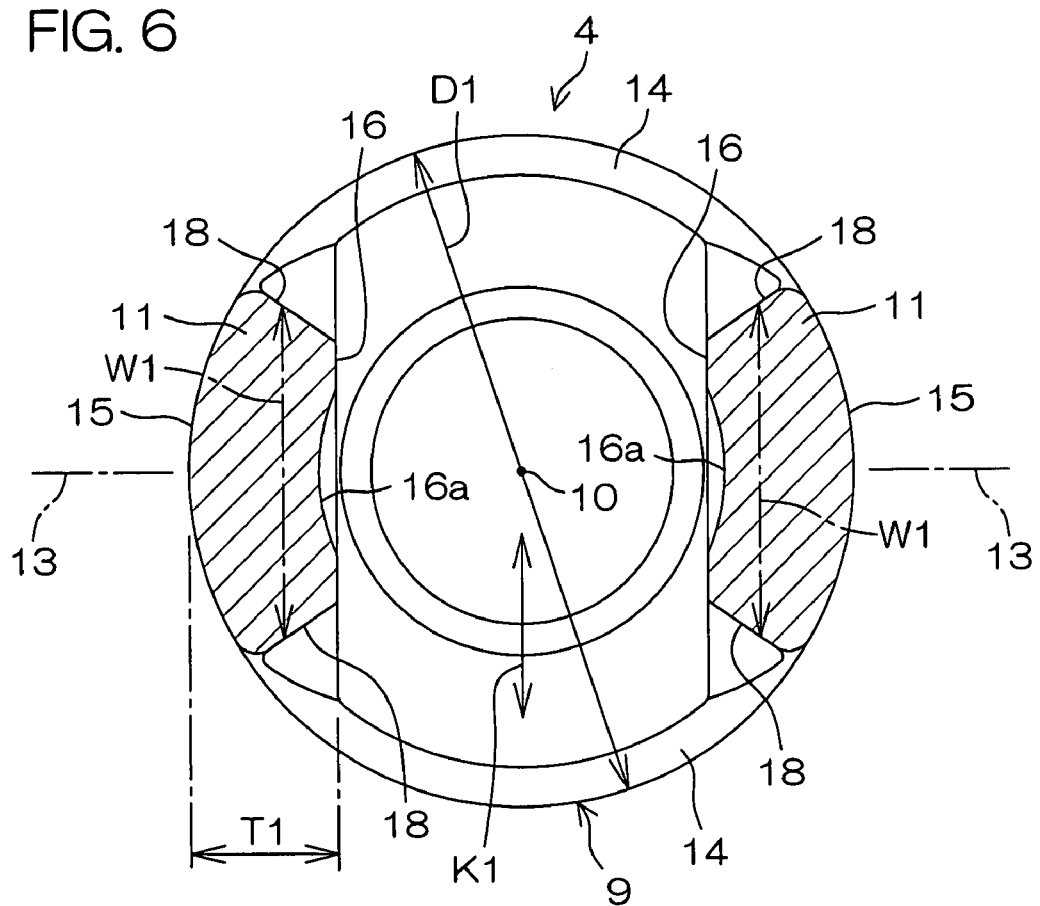

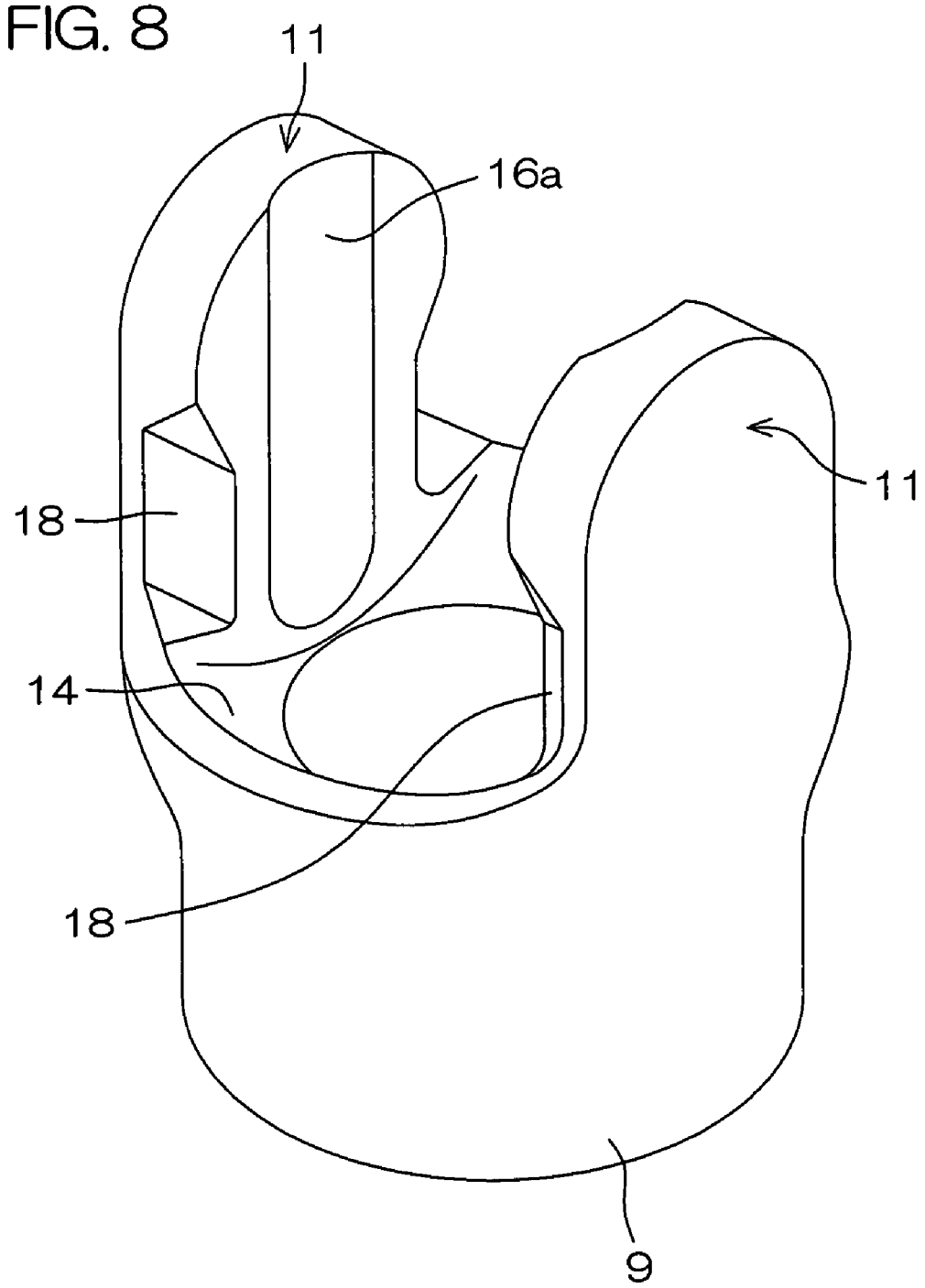

YOKE FOR UNIVERSAL JOINT AND UNIVERSAL JOINT

BACKGROUND OF THE INVENTION

1. Field of the Invention

The present invention relates to a yoke for universal joint and a universal joint.

2. Description of Related Art

In an automotive steering system, for example, an intermediate shaft for connecting a steering shaft and a steering gear such as a rack and pinion mechanism has a function to contract following the retraction of the steering gear when a vehicle collides against a front object (at primary collision). This prevents an impact of the primary collision from being transferred to a steering member such as a steering wheel.

When the intermediate shaft is contracted at the primary collision, a universal joint connecting the intermediate shaft with the steering gear and the steering shaft assumes a greater bend angle (e.g., a bend angle on the order of 60°) than a bend angle thereof while the vehicle is moving.

Since the steering member may be turned at any steering angle at the primary collision, the universal joint is required to secure the above bend angle with respect to the overall range of rotational angle of the steering member.

On the other hand, a yoke for universal joint has been proposed which is formed by punching out a sheet metal and press forming the resultant sheet metal (see, for example, Japanese Unexamined Patent Publication No. 2005-163866).

In an electronic power steering device having an electric motor for power assist disposed at a steering column, on the other hand, the intermediate shaft is designed to bear a greater load and hence, higher rigidity is required for the yoke for universal joint.

In a case where the press molded yoke is used as the yoke for universal joint, the yoke may suffer poor rigidity if the yoke is decreased in thickness in order to provide for the increase of the bend angle.

It is an object of the invention to provide a yoke for universal joint and a universal joint which feature a high rigidity and can secure a greater bend angle.

SUMMARY OF THE INVENTION

In order to achieve foregoing object, a preferred embodiment of the present invention provides a yoke for universal joint formed by punching out a sheet metal and press forming the resultant sheet metal. The yoke for universal joint comprising a cylindrical base for fixing a shaft; and a pair of arms extending from an end of the base in parallel to a center axis of the base and swingablly connected with a counterpart yoke via a cross shaft. Each of the arms is formed with a support hole for supporting a corresponding trunnion of the cross shaft via a bearing. The support hole of each of the arms has a center axis extending in a direction orthogonal to the center axis of the base. The end of the base is formed with a relief portion including a concave curved surface. The concave curved surface of the relief portion at the end of the base has a center of curvature located at place offset from a center of the joint toward a distal end of the arm.

In order to avoid interference between the end of the base of the yoke for universal joint and a distal end of a counterpart yoke, it may be possible to provide the relief portion at the end of the base, shaped in a concave spherical surface and having a concentric relation with the center of the joint, and to define a radius of the concave spherical surface to be greater than a radius of the swing motion of the counterpart yoke. In this case, however, the relief portion intersects with the base at an acute angle, so that the end of the base is decreased in thickness. Therefore, the yoke has a drawback of low rigidity.

According to the embodiment, on the other hand, the relief portion formed at the end of the base and including the concave curved surface has the center of curvature located at place offset from the center of the joint toward the distal end of the arm. That is, the embodiment adopts a layout wherein the concave curved surface of the relief portion is in a non-concentric relation with the center of the joint. Thus, the embodiment is adapted to overcome the above drawback and to attain an advantage to increase the bend angle while increasing rigidity.

It should be noted that the concave curved surface of the relief portion may have the center of curvature located at place on the center axis of the base and otherwise. In a case where the concave curved surface of the relief portion does not have the center of curvature located at place on the center axis of the base, a normal line of the concave curved surface of the relief portion only need to have a point closest to the center axis of the base offset from the center of the joint toward the distal end of the arm.

BRIEF DESCRIPTION OF THE DRAWINGS

FIG. 6 is a sectional view taken on the line VI-VI in FIG. 4;

FIG. 8 is a schematic perspective view of an intermediary body for yoke manufacture;

DETAILED DESCRIPTION OF THE PREFERRED EMBODIMENT

A preferred embodiment of the invention will be described with reference to the accompanying drawings.

Figure 1:
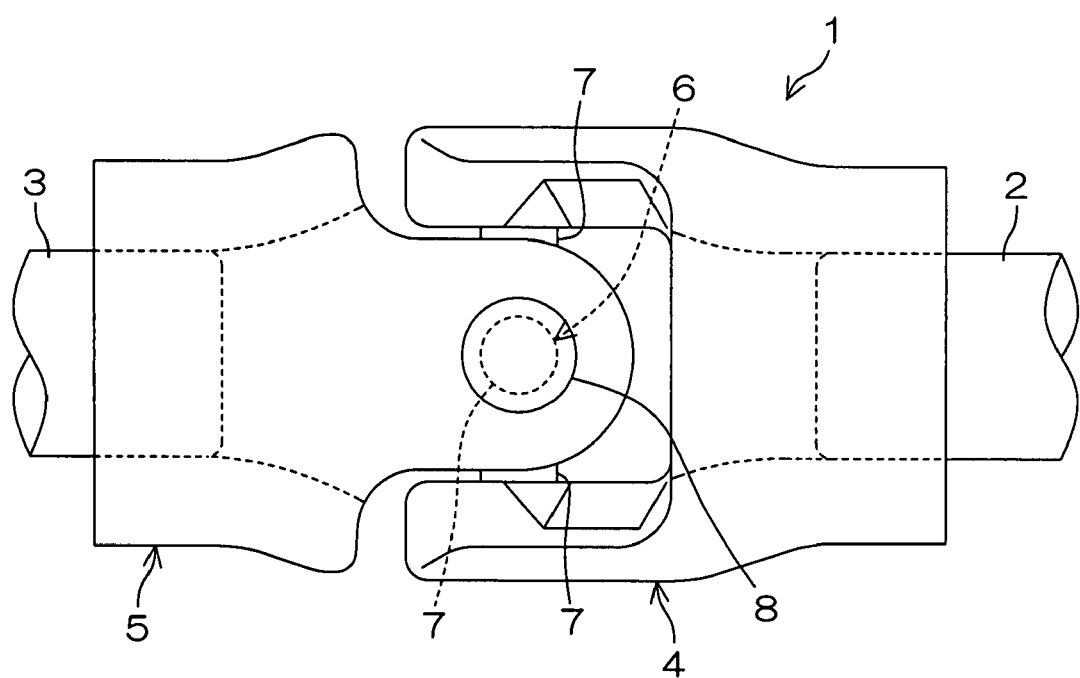
FIG. 1 is a front view of a universal joint for showing a state where the universal joint including a yoke according to one embodiment of the invention is connected with shafts.

FIG. 1 is a schematic side view showing a universal joint employing a yoke for universal joint according to one embodiment of the invention. Referring to FIG. 1, a universal joint 1 connects a first shaft 2 and a second shaft 3. The first shaft 2 comprises, for example, a steering shaft of an automotive vehicle, whereas the second shaft 3 comprises, for example, an intermediate shaft for connecting the steering shaft and a steering mechanism such as a rack and pinion mechanism.

The universal joint 1 includes: a first yoke 4 as a yoke for universal joint connected with the first shaft 2; a second yoke 5 as another yoke (counterpart yoke) connected with the second shaft 3; and a cross shaft 6 interconnecting the first yoke 4 and the second yoke 5.

The first and second yokes 4, 5 have the same constitution and each support each corresponding pair of trunnions 7 via a bearing 8 such as a needle roller bearing.

Figure 2:
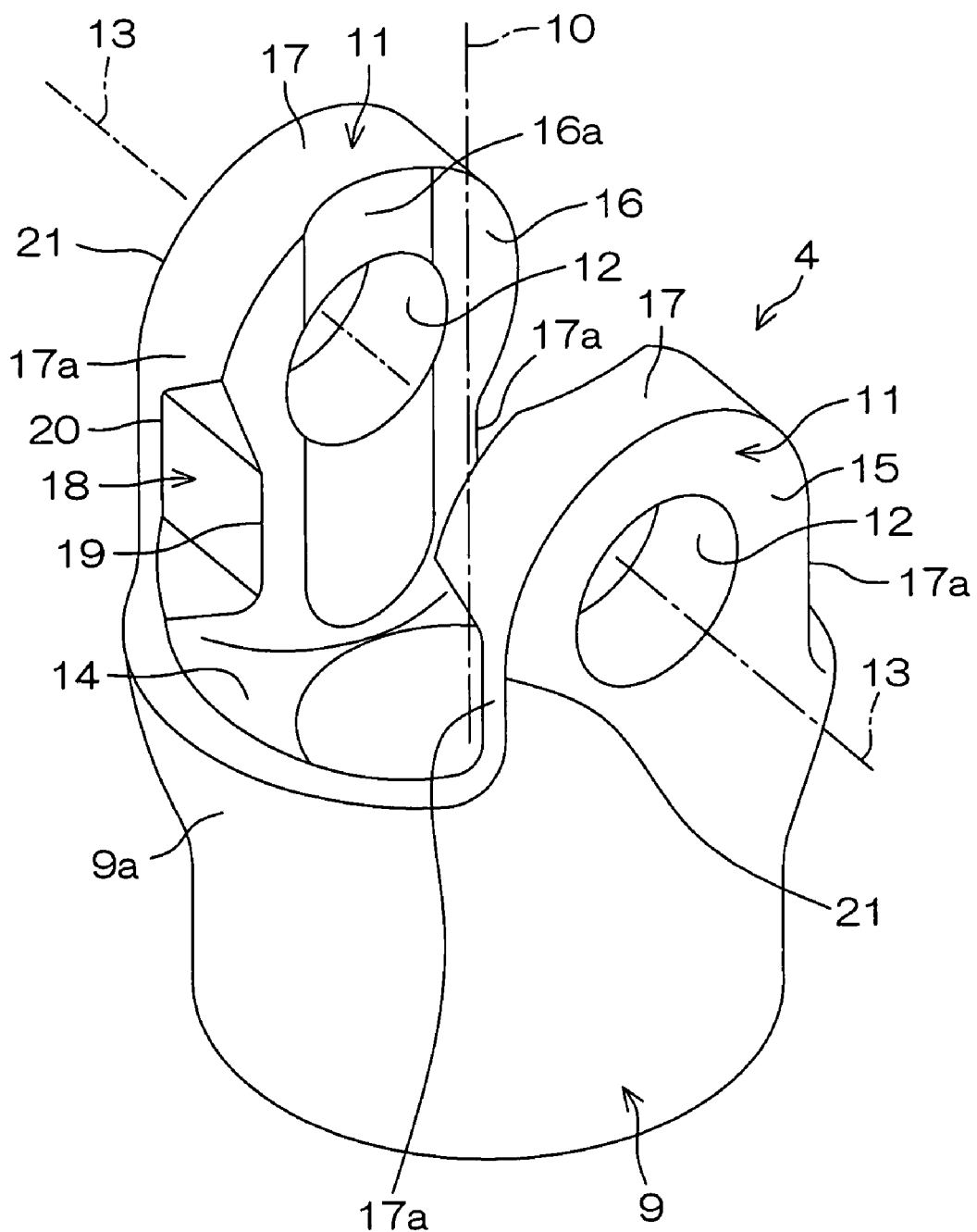
FIG. 2 is a schematic perspective view of the yoke.
Figure 3:
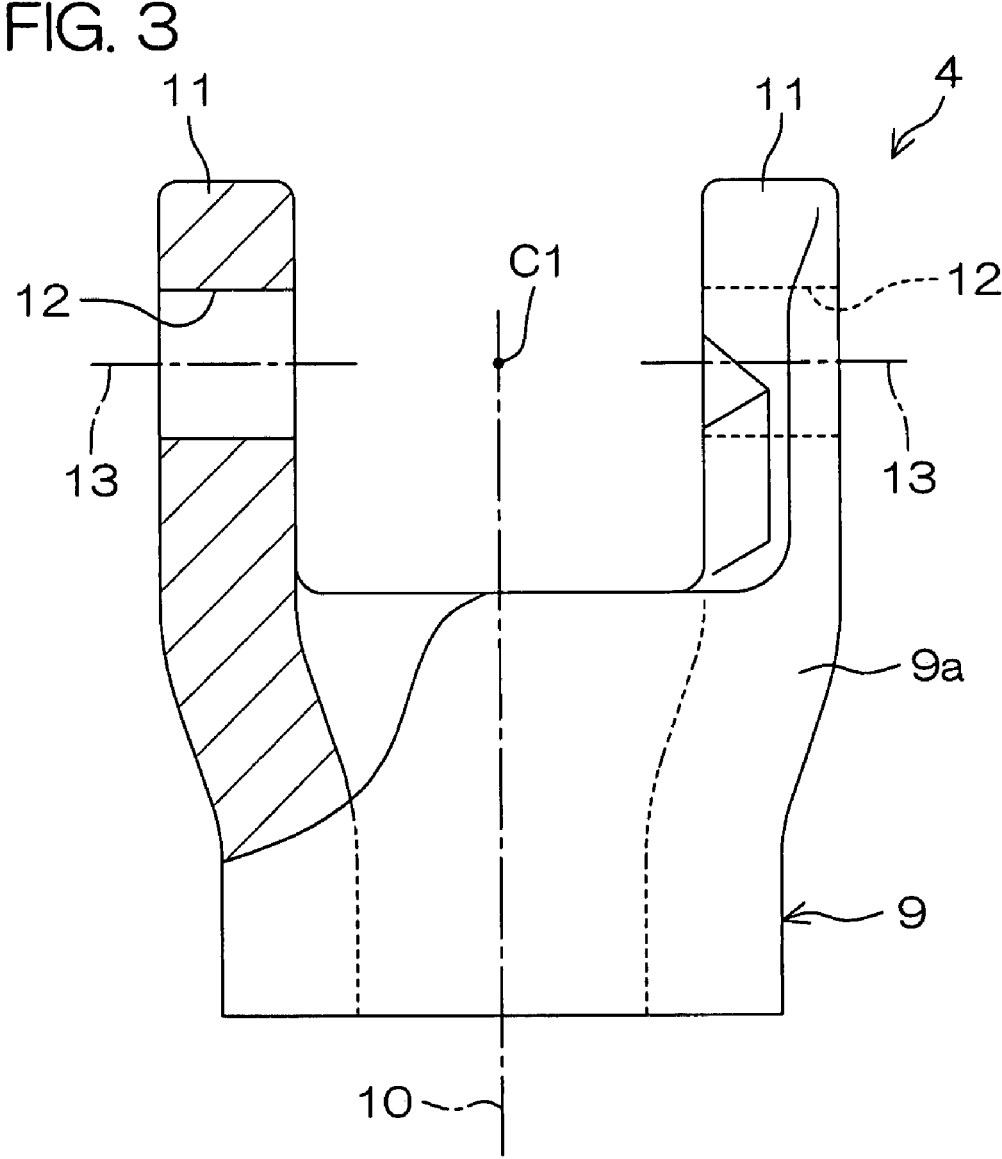
FIG. 3 is a partly cut-away front view of the yoke.

The following description is made with reference to the first yoke 4. FIG. 2 is a perspective view of the first yoke 4. FIG. 3 is a partly cut-away front view of the first yoke 4, and FIG. 4 is a vertical sectional view of the first yoke 4.

Referring to FIG. 1 and FIG. 3, the first yoke 4 is formed by punching out a sheet metal having a thickness of 6 to 9 mm, for example, and by press molding the resultant the sheet metal. The first yoke 4 includes: a cylindrical base 9 for fixing the yoke to the shaft; and a pair of arms 11 provided to extend from a first end 9a of the base 9 in parallel to a center axis 10 of the base 9, and to oppose each other.

Each of the arms 11 is formed with a support hole 12 for supporting a corresponding trunnion 7 of the cross shaft 6 via the bearing 8. Each of the support holes 12 has a center axis 13 extending in a direction orthogonal to the center axis 10 of the base 9.

Figure 4:
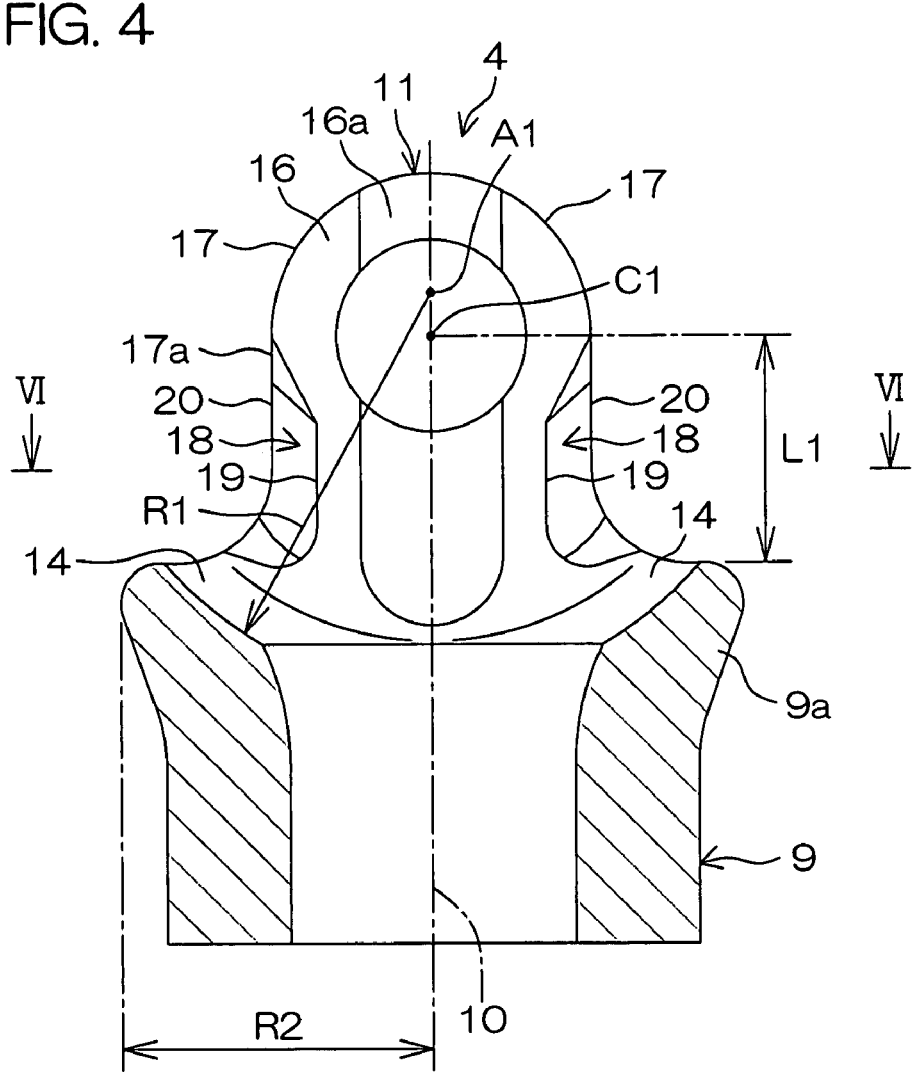
FIG. 4 is a vertical sectional view of the yoke.

Referring to FIG. 2 and FIG. 4, the first end 9a of the cylindrical base 9 is formed with a first relief portion 14 including a concave curved surface. Specifically, the first relief portion 14 defines a concave spherical surface. For instance, a part of or the all of the first relief portion 14 is defined by a sphere (curvature radius R1) in a non-concentric relation with a center C1 of the joint 1.

The concave spherical surface defined by the first relief portion 14 has a center of curvature A1 located between the center C1 of the joint 1 and a distal end of the arm 11 on the center axis 10 of the base 9. In other words, the concave spherical surface (concave curved surface) constituting the first relief portion 14 has the center of curvature Al thereof offset from the center C1 of the joint 1 toward the distal end of the arm 11.

Each of the arms 11 includes: an outside surface 15; an inside surface 16; and an edge portion 17 having an inverted-U shape. The edge portion 17 of each arm 11 includes a pair of side edges 17a substantially extending in parallel to the center axis 10 of the base 9. The inside surface 16 is formed with a gutter-like concave groove 16a extending in parallel to the center axis 10 of the base 9. Each side edge 17a is formed with a second relief portion 18 including a flat plane defining a parallelogram.

The flat plane of the second relief portion 18 and the corresponding side edge 17a of the corresponding arm 11 intersect each other on first and second intersections 19, 20 extending in parallel to the center axis 10 of the base 9. These intersections 19, 20 constitute two opposite sides of the parallelogram. The first intersection 19 is relatively closer to the center axis 10 of the base 9, whereas the second intersection 20 is relatively farther from the center axis 10 of the base 9. With respect to a direction parallel to the center axis 10 of the base 9, the first intersection 19 is relatively farther from the center C1 of the joint 1, whereas the second intersection 20 is relatively closer to the center C1 of the joint 1. In this manner, the arm 11 is provided with relief at only necessary areas for avoiding interference with the counterpart yoke 5. Thus, the joint 1 can achieve a great bend angle (e.g., 60°) while securing high rigidity of the arms 11.

Figure 5:
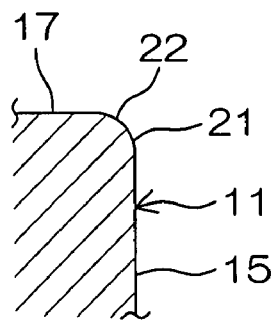
FIG. 5 is a sectional view showing a principal part of an arm of the yoke.

As shown in FIG. 5, a chamfer 22 for relief is formed on the overall length of a ridge 21 between the edge portion 17 having the inverted-U shape and the outside surface 15 of each arm 11 such that stress concentration on the arm 11 may be alleviated. The chamfer 22 is continuous to the first relief portion 14 at the first end 9a of the base 9 so that stress concentration generated on a root of the arm 11 may be alleviated to increase rigidity and durability.

The distance L1 from the center C1 of the joint 1 to the first end 9a of the base 9 is designed not to exceed the maximum radius of rotation R2 of the base 9 (namely, L1≦R2). In this manner, the arm 11 is designed to have a short length thereby securing the rigidity.

The maximum thickness T1 (see FIG. 6) of the arm 11 is defined to be at least 15% of the maximum diameter of rotation D1 (D1=2×R2) of the base 9 (namely, T1≧0.15×D1). Thus, the arm 11 can secure a determined rigidity so that controllability may be secured.

With respect to a direction parallel to a direction K1 orthogonal to the center axis 10 of the base 9 and the center axis 13 of the support hole 12, the second relief portions 18 of the pair of side edges 17a of the arm 11 have a width W1 progressively decreased toward the center axis 10 of the base 9, as shown in FIG. 6 showing a section taken on the line VI-VI in FIG. 4. Accordingly, the interference between the corresponding side edges 17a of the yokes 4, 5 can be effectively prevented, so that the yokes are adapted to achieve the great bend angle (e.g., 60°).

Figure 7A:
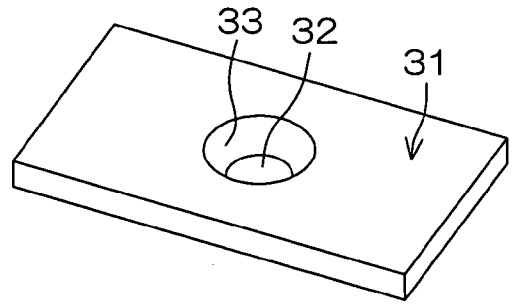
FIG. 7A, FIG. 7B, FIG. 7C and FIG. 7D are a group of schematic perspective views showing the steps of forming the yoke from a sheet metal, in this order.

Next, an exemplary procedure of forming the first yoke 4 by punching out and by press forming is described with reference to FIG. 7A to 7D and FIG. 8. First, a lower hole 32 drilled through an elongate sheet metal 31 is expanded by burring, as shown in FIG. 7A. A periphery of the lower hole 32 is extruded in one direction, whereby a cylindrical portion 33 is formed. The burring process may be replaced by drawing.

Figure 7B:
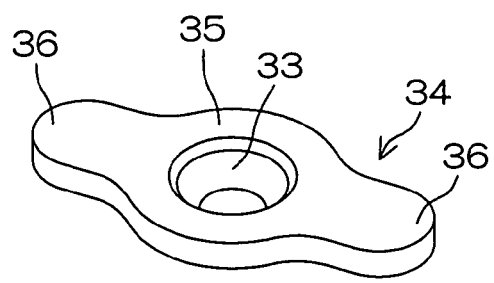

Subsequently, as shown in FIG. 7B, a blank as an intermediate member 34 having a predetermined outside shape is formed by a trimming process. The blank as an intermediate member 34 includes: a first portion 35 to form the base formed around the cylindrical portion 33 and designed; and a pair of second portions 36 to form the arms sandwiching the first portion 35 therebetween and extending in mutually opposite directions.

Figure 7C:
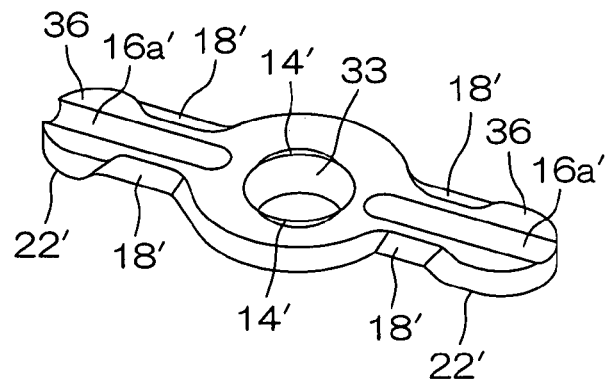

Next, as shown in FIG. 7C, a coining process is performed to form portions 16a', 14', 18' and 22' on each of the second portions 36 such that these portions 16a', 14', 18' and 22' constitute the concave groove 16a, the first relief portion 14, the second relief portion 18 and the chamfer 22, respectively.

Figure 7D:
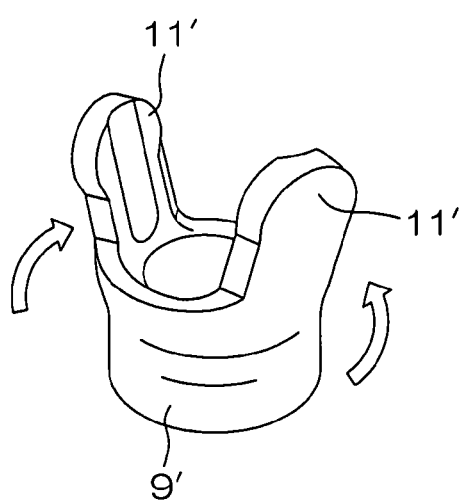

As shown in FIG. 7D, the cylindrical portion 33 is subjected to drawing a process into a shaped portion 9' approximate to the base 9. While the pair of second portions 36 are bent to form portions 11' approximate to the pair of arms 11 by a bending process.

Subsequently, by shaping and coining processes the base 9 and the pair of arms 11 are formed as shown in FIG. 8.

Next, an inner periphery of the base 9 is subjected to serration, while each of the arms 11 is machined to form the support hole 12 therethrough, whereby the first yoke 4 is obtained as shown in FIG. 2.

Figure 9:
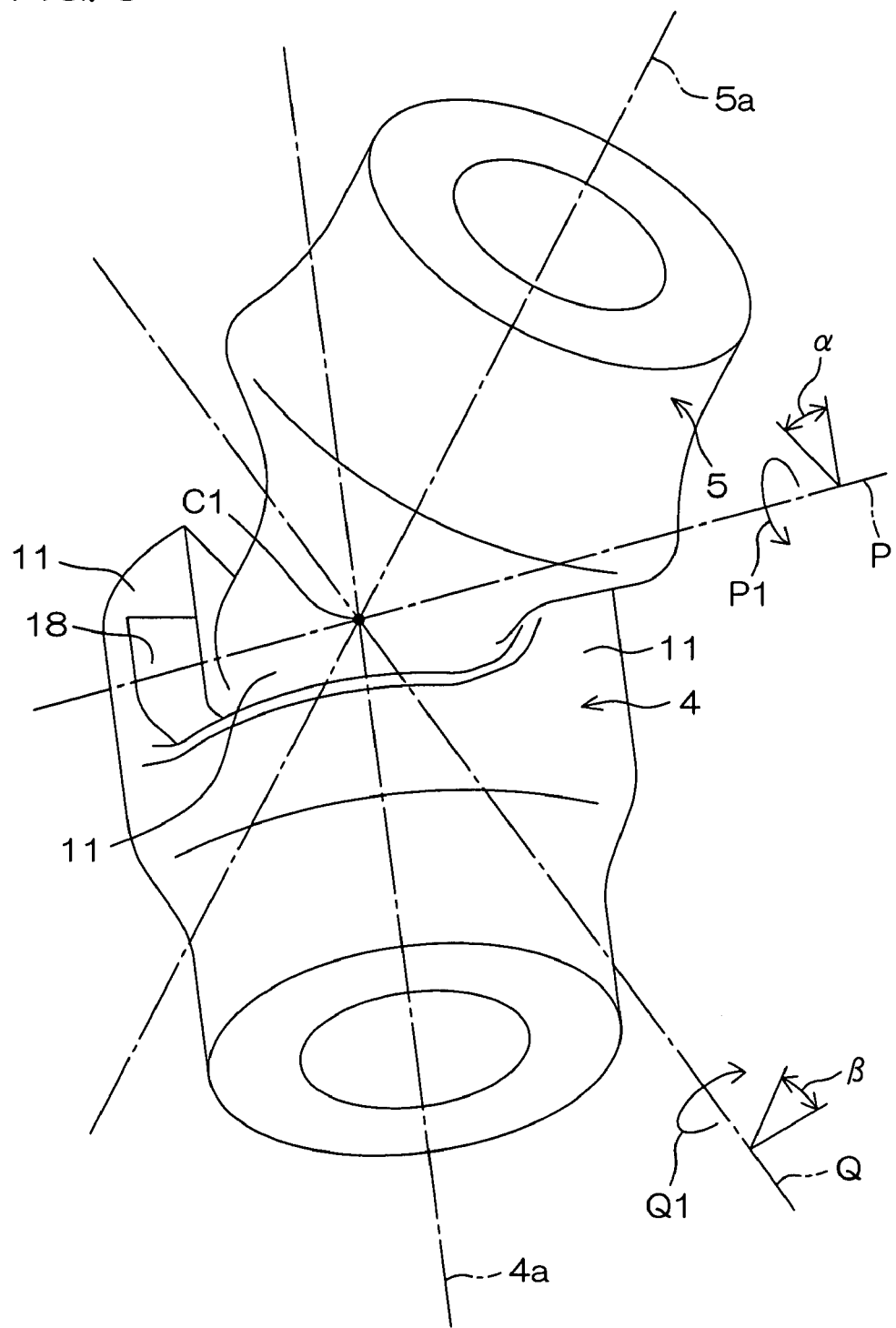
FIG. 9 is a schematic perspective view showing the universal joint at the maximum bend angle.

FIG. 9 schematically shows a state where the universal joint 1 achieves the maximum bend angle of 60°. FIG. 9 omits the cross shaft.

A first axis P is an axis of the paired trunnions 7 connected with the first yoke 4 (equivalent to the center axis 13 of the support holes 12 of the first yoke 4). A second axis Q is an axis orthogonal to both the above first axis P and a rotation axis 4a of the first yoke 4.

In a state where the second yoke 5 is rotationally shifted from an unbent state about the first axis P in a first rotational direction P1 through a rotational angle α (α=45°) and as rotated about the second axis Q in a second direction Q1 through a rotational angle β (β=45°), both the yokes 4, 5 encounter the severest conditions for the interference between the corresponding arms 11 thereof. The first rotational direction P1 and the second rotational direction Q1 are directed opposite to each other.

Figure 10:
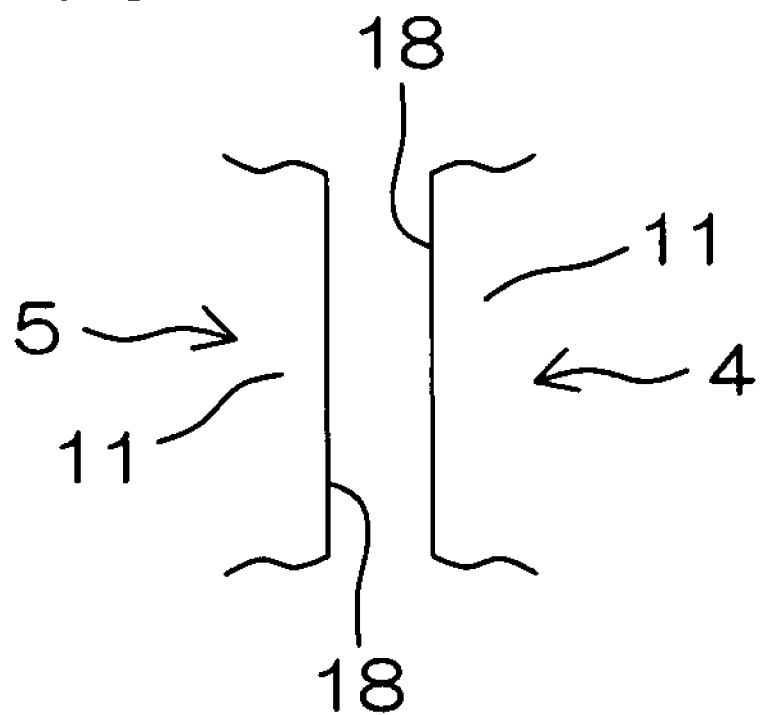
FIG. 10 is a schematic diagram showing a principal part of corresponding arms of the yokes at the maximum bend angle.

As schematically shown in FIG. 10, the embodiment is designed such that the flat plane as the second relief portion 18 of the arm 11 of the first yoke 4 and the flat plane as the second relief portion 18 of the corresponding arm 11 of the second yoke 5 are positioned in a parallel relation via a predetermined gap therebetween when these yokes are subjected to the severest conditions for the interference between these arms. Accordingly, the interference between the corresponding arms 11 of these yokes 4, 5 can be avoided by reducing a bare minimum amount of thickness of the arms 11. As a result, the universal joint 1 is adapted to secure the great bend angle while securing the secure strength thereof.

According to the embodiment, an advantage can be obtained to increase the bend angle and the rigidity of the joint 1 because the first relief portion 14 formed at the first end 9a of the base 9 and defined by the concave curved surface has the center of curvature A1 located at place offset from the center C1 of the joint 1 toward the distal end of the arm 11.

It should be noted that the center of curvature A1 of the first relief portion 14 need not necessarily be located on the center axis 10 of the base 9. In a case where the center of curvature A1 of the first relief portion 14 is not located on the center axis 10 of the base 9, a normal line of the first relief portion 14 having a position closest to the center axis 10 of the base 9 may be offset from the center C1 of the joint 1 toward the distal end of the arm 11.

In the second relief portion 18 provided at each of the side edges 17a of each arm 11, the width W1 of the arm 11 with respect to the direction parallel to the direction K1 orthogonal to the center axis 10 of the base 9 and the center axis 13 of the support hole 12 is progressively decreased toward the center axis 10 of the base 9, as shown in FIG. 6. Therefore, the interference between the corresponding side edges 17a of the yokes 4, 5 may be effectively avoided. Hence, the yokes can achieve the great bend angle (e.g., 60°).

The second relief portion 18 of each side edge 17a includes the flat plane defining the parallelogram. The flat plane intersects with the corresponding side edge 17a of the corresponding arm 11 on the first intersection 19 and the second intersection 20 extending in parallel to the center axis 10 of the base 9. The first intersection 19 is relatively closer to the center axis 10 of the base 9, whereas the second intersection 20 is relatively farther from the center axis 10 of the base 9. With respect to the direction parallel to the center axis 10 of the base 9, the first intersection 19 is relatively farther from the center C1 of the joint 1, whereas the second intersection 20 is relatively closer to the center C1 of the joint 1. Thus, the relief is only provided at the necessary areas of the arms 11 such as to avoid the interference with the counterpart yoke 5. Hence, the joint 1 can achieve the great bend angle (e.g., 60°) while securing the strength of the arms 11.

In the present invention, the chamfer 22 for relief is formed on the overall length of the ridge 21 between the outside surface 15 of each arm 11 and the edge portion 17 having the inverted-U shape. Hence, the stress concentration on the arm 11 may be effectively alleviated.

What is more, the above chamfer 22 is formed continuous to the first relief portion 14 at the first end 9a of the base 9. Therefore, the yoke 4 may decrease in the stress concentration generated on the root of the arm 11, thereby achieving to increase strength and durability.

The length of the arm 11 is shortened such that the distance L1 from the center C1 of the joint 1 to the first end 9a of the base 9 does not exceed the maximum radius of rotation R2 of the base 9, thereby securing the rigidity of the arm 11.

Since the maximum thickness T1 of the arm 11 is defined to be at least 15% of the maximum diameter of rotation D1 of the base 9, the arm 11 can secure the determined rigidity so that the controllability may be secured.

While the invention has been described in greater details with reference to the specific embodiments thereof, it is to be understood that changes, modifications and equivalents will occur to those skilled in the art who have understood the above contents. The scope of the invention, therefore, is defined by the appended claims and their equivalents.

The present application is in correspondence to Japanese Patent Application No. 2006-169140 filed with Japanese Patent Office on Jun. 19, 2006, and the whole disclosure thereof is incorporated herein by reference.

The invention claimed is:

1. A yoke for a universal joint, the yoke being formed by punching out sheet metal and press forming the sheet metal, comprising:

a cylindrical base for fixing a shaft, an end of the cylindrical base being formed with a first relief portion including a concave curved surface; and a pair of arms extending from an end of the cylindrical base in parallel to a center axis of the cylindrical base and swingably connectable with a counterpart yoke via a cross shaft, each of the arms being formed with a support hole for supporting a corresponding trunnion of the cross shaft via a bearing, each of the support holes having a center axis extending in a direction orthogonal to the center axis of the cylindrical base, each of the pair of arms including an edge portion having an inverted-U shape and a pair of side edges extending in parallel to the center axis of the base, each of the side edges including a second relief portion, a width of the second relief portion progressively decreasing toward the center axis of the cylindrical base in a direction orthogonal to the center axis of the base and to the center axis of the support hole, and each of the second relief portions including a flat plane defining a parallelogram, the flat plane intersecting with the corresponding side edge of the corresponding arm on first and second intersections extending in parallel to the center axis of the base, the first intersection being relatively closer to the center axis of the base and the second intersection being relatively farther from the center axis of the base, and the first intersection being relatively farther from the center of the joint than the second intersection, with respect to a direction parallel to the center axis of the base, wherein the concave curved surface has a center of curvature offset from a center of the joint toward a distal end of the arms.

2. The yoke for universal joint according to claim 1, wherein a chamfer for relief is formed on the overall length of a ridge between an outside surface of each of the arms and the edge portion having the inverted-U shape.

3. The yoke for universal joint according to claim 2, wherein the chamfer for relief is continuous to the relief portion formed at the end of the base and including the concave curved surface.

4. The yoke for universal joint according to claim 1, wherein a distance from the center of the joint to the end of the base is defined not to exceed the maximum radius of rotation of the base.

5. The yoke for universal joint according to claim 1, wherein the maximum thickness of each of the arms is at least 15% of the maximum diameter of rotation of the base.

6. A universal joint comprising first and second yokes connected with each other via a cross shaft including four trunnions, and the universal joint using the yoke for universal joint according to claim 1 as each of the first and second yokes, wherein in a state where the second yoke is rotationally shifted from an unbent position about a first axis through a rotation angle of 45° and about a second axis through a rotation angle of 45°, the flat plane as the relief portion at each side edge of each of the arms of the first yoke and the flat plane as the relief portion of the corresponding side edge of the corresponding arm of the second yoke are positioned in a parallel relation via a predetermined gap therebetween, where the first axis is an axis of a pair of trunnions connected with the first yoke, and the second axis is an axis orthogonal to both the first axis and a rotation axis of the first yoke.

* * * * *